United States Patent
Lamberti et al.

(10) Patent No.: US 11,549,389 B2
(45) Date of Patent: Jan. 10, 2023

(54) GAS TURBINE ENGINE COMMUNICATION GATEWAY WITH INTEGRAL ANTENNAS

(71) Applicant: United Technologies Corporation, Farmington, CT (US)

(72) Inventors: William C. Lamberti, Wethersfield, CT (US); Paul Raymond Scheid, West Hartford, CT (US); Jason E. Posniak, Broad Brook, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 229 days.

(21) Appl. No.: 16/839,108

(22) Filed: Apr. 3, 2020

(65) Prior Publication Data
US 2020/0378271 A1   Dec. 3, 2020

Related U.S. Application Data

(60) Provisional application No. 62/835,162, filed on Apr. 17, 2019.

(51) Int. Cl.
*F01D 21/00*   (2006.01)
*F02C 9/00*   (2006.01)

(52) U.S. Cl.
CPC ............. *F01D 21/003* (2013.01); *F02C 9/00* (2013.01); *F05D 2260/82* (2013.01); *F05D 2260/83* (2013.01); *F05D 2270/80* (2013.01)

(58) Field of Classification Search
CPC ...... F01D 21/003; F02C 9/00; F05D 2260/82; F05D 2260/83; F05D 2270/80; G05B 23/02; G08C 17/02
See application file for complete search history.

(56) References Cited

U.S. PATENT DOCUMENTS

| | | |
|---|---|---|
| 6,167,239 A | 12/2000 | Wright et al. |
| 6,173,159 B1 | 1/2001 | Wright et al. |

(Continued)

FOREIGN PATENT DOCUMENTS

| | | |
|---|---|---|
| EP | 1400942 A2 | 3/2004 |
| EP | 2378490 A1 | 10/2011 |

(Continued)

OTHER PUBLICATIONS

Cfmi Customer Training Center Snecma: Training Manual CFM56-5A Engine Systems; dated Apr. 1, 2020; https://eduscol.education.fr/sti/sites/eduscol.education.fr.sti/files/ressources/pedagogiques/11659/11659-ctc-045-engine-systems.pdf; 467 pages.

(Continued)

*Primary Examiner* — Kurt Philip Liethen
(74) *Attorney, Agent, or Firm* — Cantor Colburn LLP

(57) ABSTRACT

A communication adapter of a gas turbine engine of an aircraft includes a housing configured to be coupled to the gas turbine engine, a plurality of antennas integrated in the housing, a memory system and processing circuitry. The processing circuitry is configured to establish communication with an engine control mounted on the gas turbine engine, establish wireless communication between the communication adapter and an offboard system external to the aircraft through at least one of the antennas integrated in the housing of the communication adapter, and authenticate communication requests at the communication adapter for data sent between the offboard system and the engine control.

16 Claims, 4 Drawing Sheets

(56) References Cited

U.S. PATENT DOCUMENTS

| | | | |
|---|---|---|---|
| 8,078,354 B2 | 12/2011 | Loda | |
| 8,344,912 B2 | 1/2013 | Mitchell et al. | |
| 8,768,537 B2 | 7/2014 | Kim et al. | |
| 9,253,816 B1* | 2/2016 | Gashette | H04W 88/08 |
| 9,303,523 B2 | 4/2016 | Rodriguez et al. | |
| 9,367,970 B2 | 6/2016 | Ziarno | |
| 9,435,819 B1 | 9/2016 | Fraley et al. | |
| 9,464,905 B2 | 10/2016 | Lewis | |
| 9,587,576 B2 | 3/2017 | Stanek et al. | |
| 9,915,535 B2 | 3/2018 | Jordan et al. | |
| 10,035,609 B2 | 7/2018 | Ziarno | |
| 10,093,436 B2 | 10/2018 | Bulumulla et al. | |
| 10,114,634 B2 | 10/2018 | Quin et al. | |
| 10,444,748 B2 | 10/2019 | Feenstra et al. | |
| 10,633,106 B2 | 4/2020 | Gelwan et al. | |
| 10,880,070 B1 | 12/2020 | Delaney et al. | |
| 2001/0038143 A1* | 11/2001 | Sonobe | H01L 25/072 257/E25.012 |
| 2004/0056766 A1 | 3/2004 | Butz et al. | |
| 2004/0206818 A1 | 10/2004 | Loda et al. | |
| 2005/0017876 A1* | 1/2005 | Ziarno | H04L 67/12 701/31.4 |
| 2006/0108988 A1* | 5/2006 | McKelvey | H02M 5/458 700/286 |
| 2009/0049441 A1 | 2/2009 | Mii et al. | |
| 2009/0119657 A1 | 5/2009 | Link, II | |
| 2010/0049377 A1 | 2/2010 | Scheid et al. | |
| 2013/0006581 A1 | 1/2013 | Singh et al. | |
| 2013/0332011 A1 | 12/2013 | Ziarno | |
| 2013/0332025 A1 | 12/2013 | Ziarno | |
| 2014/0123625 A1 | 5/2014 | Snell | |
| 2015/0330869 A1 | 11/2015 | Ziarno | |
| 2016/0110179 A1 | 4/2016 | Weckesser et al. | |
| 2016/0178464 A1 | 6/2016 | Burns et al. | |
| 2016/0196457 A1 | 7/2016 | Mylaraswamy et al. | |
| 2016/0207639 A1* | 7/2016 | Ellis | B64F 5/60 |
| 2016/0222889 A1 | 8/2016 | Snyder | |
| 2016/0260265 A1* | 9/2016 | Buehler | G07C 5/008 |
| 2016/0322826 A1* | 11/2016 | Okino | H02J 3/381 |
| 2016/0377506 A1 | 12/2016 | Bizud | |
| 2017/0089577 A1 | 3/2017 | Desilva et al. | |
| 2017/0155514 A1 | 6/2017 | Schulz et al. | |
| 2017/0205817 A1 | 7/2017 | Lyons et al. | |
| 2017/0234233 A1 | 8/2017 | Schwarz et al. | |
| 2017/0259942 A1* | 9/2017 | Ziarno | G05B 23/0283 |
| 2017/0287239 A1* | 10/2017 | Levy | G07C 5/0808 |
| 2017/0334576 A1* | 11/2017 | Shams | B64D 43/00 |
| 2017/0373612 A1 | 12/2017 | Sellinger et al. | |
| 2018/0006916 A1 | 1/2018 | Scholten et al. | |
| 2018/0007136 A1 | 1/2018 | Scholten et al. | |
| 2018/0011481 A1 | 1/2018 | Smit et al. | |
| 2018/0023413 A1 | 1/2018 | Chowdhury et al. | |
| 2018/0023484 A1 | 1/2018 | Gelwan et al. | |
| 2018/0045122 A1 | 2/2018 | Veilleux | |
| 2018/0051587 A1 | 2/2018 | Fletcher | |
| 2018/0167391 A1 | 6/2018 | Lawson et al. | |
| 2018/0170575 A1 | 6/2018 | Ziarno | |
| 2018/0205658 A1 | 7/2018 | Sullivan | |
| 2018/0225629 A1 | 8/2018 | Brodersen et al. | |
| 2018/0297718 A1 | 10/2018 | Adibhatla | |
| 2018/0365265 A1 | 12/2018 | Blanc et al. | |
| 2019/0005744 A1 | 1/2019 | Curtis et al. | |
| 2019/0012853 A1 | 1/2019 | Scholten et al. | |
| 2019/0102162 A1 | 4/2019 | Pitre et al. | |
| 2019/0128191 A1 | 5/2019 | Moravek et al. | |
| 2019/0322299 A1 | 10/2019 | Mong et al. | |
| 2019/0367190 A1 | 12/2019 | Bewlay et al. | |
| 2019/0385057 A1 | 12/2019 | Litichever et al. | |
| 2019/0385120 A1 | 12/2019 | Yund et al. | |
| 2020/0044916 A1 | 2/2020 | Kaufman et al. | |
| 2020/0076596 A1 | 3/2020 | Chopart | |
| 2020/0331620 A1 | 10/2020 | Scheid | |
| 2020/0332675 A1 | 10/2020 | Scheid et al. | |
| 2020/0332722 A1 | 10/2020 | Lamberti et al. | |
| 2020/0333004 A1 | 10/2020 | Scheid et al. | |
| 2020/0334925 A1 | 10/2020 | Scheid et al. | |
| 2020/0362766 A1 | 11/2020 | Lamberti et al. | |
| 2020/0380508 A1 | 12/2020 | Sheriff | |
| 2021/0209868 A1 | 7/2021 | Scheid et al. | |

FOREIGN PATENT DOCUMENTS

| | | |
|---|---|---|
| EP | 3217364 A2 | 9/2017 |
| EP | 3260939 A1 | 12/2017 |
| WO | 2010028729 A1 | 3/2010 |
| WO | 2018158102 A1 | 9/2018 |

OTHER PUBLICATIONS

Extended European Search Report; dated Aug. 24, 2020; EP Application No. 20170086.1-1009; 11 pages.

Extended European Search Report; dated Aug. 24, 2020; Application No. 20167171.6-1202; 8 pages.

Extended European Search Report; dated Sep. 8, 2020; Application No. 20167178.1-1202; 9 pages.

Extended European Search Report; date Sep. 8, 2020; Application No. 20167253.2-1202; 10 pages.

Extended European Search Report; dated Oct. 2, 2020; Application No. 20170071.3-1202; 11 pagaes.

Extended European Search Report; dated Sep. 25, 2020; Application No. 20170066.3-1009; 12 pages.

Extended European Search Report; Sep. 18, 2020; Application No. 20167001.5-1009; 9 pages.

Partial European Search Report; Application No. 20170098.6-1202; date Sep. 21, 2020; 16 pages.

Baek et al., "Making air traffic surveillance more reliable: a new authentication framework for automatic dependent surveillance-broadcast (ADS-B) based on online/offiline identity-based signature", Security Comm. Networks 2015; 8:740-750.

* cited by examiner

GAS TURBINE ENGINE COMMUNICATION GATEWAY WITH INTEGRAL ANTENNAS

CROSS-REFERENCE TO RELATED APPLICATION

This application claims the benefit of priority to U.S. Provisional Application No. 62/835,162 filed Apr. 17, 2019, the disclosure of which is incorporated herein by reference in its entirety.

BACKGROUND

The subject matter disclosed herein generally relates to gas turbine engine communication systems and, more particularly, to a gas turbine engine communication gateway with integral antennas.

A control system of a gas turbine engine uses multiple configuration control items, such as control software, data, trim updatable values, and the like to control operation of the gas turbine engine and monitor performance of the gas turbine engine. Once a gas turbine engine is deployed in the field, it can be difficult to access data captured and/or computed by the control system and to make updates to the configuration control items. A gas turbine engine can be deployed in the field for an extended service life, such as a period of decades. Computer system technology and communication technology can evolve at a rapid pace adding to the challenges of interfacing with offboard systems as the offboard technology continues to advance during the lifespan of the engine.

BRIEF DESCRIPTION

According to one embodiment, a communication adapter of a gas turbine engine of an aircraft includes a housing configured to be coupled to the gas turbine engine, a plurality of antennas integrated in the housing, a memory system and processing circuitry. The processing circuitry is configured to establish communication with an engine control mounted on the gas turbine engine, establish wireless communication between the communication adapter and an offboard system external to the aircraft through at least one of the antennas integrated in the housing of the communication adapter, and authenticate communication requests at the communication adapter for data sent between the offboard system and the engine control.

In addition to one or more of the features described above or below, or as an alternative, further embodiments may include where the housing includes a plurality of mounts configured to couple the communication adapter to a fan case of the gas turbine engine.

In addition to one or more of the features described above or below, or as an alternative, further embodiments may include where the housing includes a metal chassis with a non-conductive substrate between the metal chassis and the antennas.

In addition to one or more of the features described above or below, or as an alternative, further embodiments may include where the antennas are partitioned into four quadrants of the housing, and the antennas include a Wi-Fi antenna, a global positioning system antenna, a cellular network antenna, and a satellite communication antenna.

In addition to one or more of the features described above or below, or as an alternative, further embodiments may include where the processing circuitry is further configured to support data uploads, downloads, software updates, test functions, and remote trouble-shooting.

In addition to one or more of the features described above or below, or as an alternative, further embodiments may include where the processing circuitry is further configured to interface with an aircraft bus of the aircraft.

In addition to one or more of the features described above or below, or as an alternative, further embodiments may include where the data includes one or more of: flight data, engine data, and sensor data.

In addition to one or more of the features described above or below, or as an alternative, further embodiments may include one or more connector ports providing at least two independent power supply connections to externally control power supplied to the processing circuitry and a communication interface of the communication adapter.

According to an embodiment, a method includes establishing, by a communication adapter, communication with an engine control mounted on a gas turbine engine of an aircraft, where the communication adapter includes a housing configured to be coupled to the gas turbine engine and a plurality of antennas integrated in the housing. Wireless communication is established between the communication adapter and an offboard system external to the aircraft through at least one of the antennas integrated in the housing of the communication adapter. Communication requests are authenticated at the communication adapter for data sent between the offboard system and the engine control.

In addition to one or more of the features described above or below, or as an alternative, further embodiments may include supporting, by the communication adapter, data uploads, downloads, software updates, test functions, and remote trouble-shooting initiated through the offboard system.

In addition to one or more of the features described above or below, or as an alternative, further embodiments may include interfacing the communication adapter with an aircraft bus of the aircraft.

In addition to one or more of the features described above or below, or as an alternative, further embodiments may include separately enabling and disabling processing circuitry and a communication interface of the communication adapter responsive to at least two independent power supply connections externally controlled through one or more connector ports of the communication adapter.

According to an embodiment, a gas turbine engine of an aircraft includes a fan section with a fan case, an engine control mounted on the fan case, the engine control, and a communication adapter mounted on the fan case. The engine control is configured to monitor and control operation of the gas turbine engine in real-time. The communication adapter includes a housing and a plurality of antennas integrated in the housing. The communication adapter is configured to establish communication with the engine control and wireless communication with an offboard system external to the aircraft through at least one of the antennas integrated in the housing of the communication adapter.

In addition to one or more of the features described above or below, or as an alternative, further embodiments may include where the engine control is coupled to one or more connector ports of the communication adapter, and the engine control is configured to control at least two independent power supply connections through the one or more connector ports to separately control power supplied to processing circuitry and a communication interface of the communication adapter.

A technical effect of the apparatus, systems and methods is achieved by incorporating communication features to securely interface an engine control system with offboard systems as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
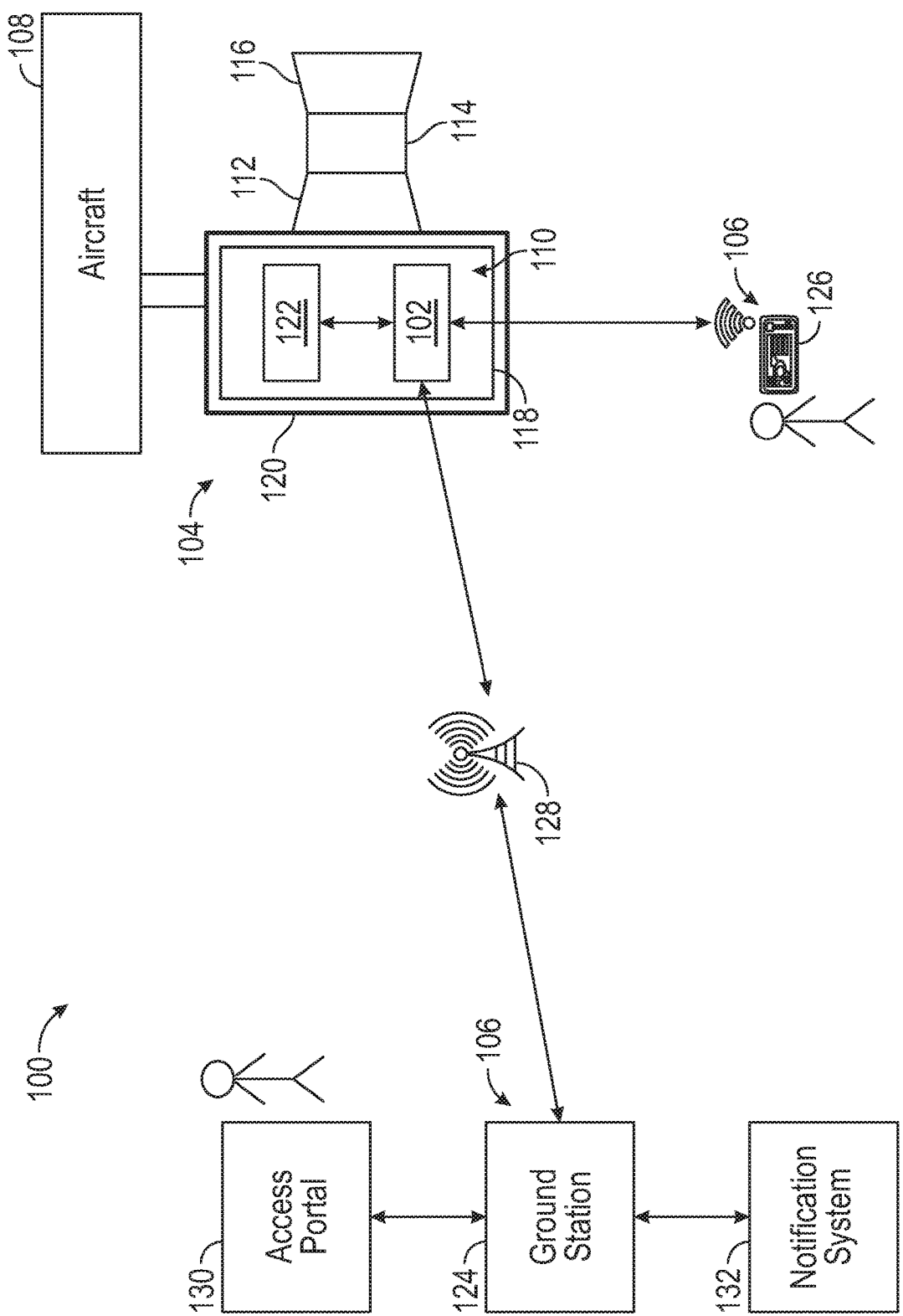
FIG. 1 is a block diagram of a system supporting wireless communication between an engine and offboard systems, in accordance with an embodiment of the disclosure.

Referring now to the drawings, FIG. 1 illustrates a system 100 supporting wireless communication between a communication adapter 102 of a gas turbine engine 104 and a plurality of offboard systems 106. The gas turbine engine 104 can be coupled to an aircraft 108, where the aircraft 108 can include multiple instances of the gas turbine engine 104. The gas turbine engine 104 can include a fan section 110, a compressor section 112, a combustor section 114, and a turbine section 116. The fan section 110 drives air along a bypass flow path, while the compressor section 112 drives air along a core flow path for compression and communication into the combustor section 114 then expansion through the turbine section 116. A fan case 118 of the fan section 110 can be covered by a cowling 120 and may provide an installation surface that is cooler than other sections 112-116 of the gas turbine engine 104.

An engine control 122 can be mounted on the fan case 118 and covered by the cowling 120. The engine control 122 is configured to monitor and control operation of the gas turbine engine 104 in real-time. In order to transfer configuration items, such as programs and data to and from the engine control 122, contemporary systems typically require that the cowling 120 is opened and multiple cables of bundled wires are coupled to the engine control 122. Such a process can ensure deliberate actions are taken in extracting data and performing updates to the engine control 122; however, the process can be slow and require large lengths of customized cables. In embodiments, the communication adapter 102, also referred to as a gas turbine engine communication gateway, is configured to establish communication with the engine control 122 and wireless communication with one or more offboard systems 106 external to the aircraft 108. Similar to the engine control 122, the communication adapter 102 can be mounted on the fan case 118 and covered by the cowling 120 of the gas turbine engine 104. Wireless communication can alleviate the need for customized cables or physically opening the cowling 120 to establish communication with the offboard systems 106.

The offboard systems 106 can include, for example, a ground station 124, a near-wing maintenance computer 126, an access portal 130, and/or other devices (not depicted) that may establish one-way or two-way wireless communication with the communication adapter 102. For example, a global positioning system (GPS) can provide one-way wireless signaling to the communication adapter 102 to assist in confirming a geographic location of the gas turbine engine 104 while the communication adapter 102 is coupled to the gas turbine engine 104. Wireless communication performed by the communication adapter 102 can be through a variety of technologies with different ranges supported. As one example, the communication adapter 102 can support Wi-Fi (e.g., radio wireless local area networking based on IEEE 802.11 or other applicable standards), GPS, cellular networks, satellite communication, and/or other wireless communication technologies known in the art. Wireless communication between the communication adapter 102 and the offboard systems 106 can be direct or indirect. For instance, wireless communication between the communication adapter 102 and ground station 124 may pass through one or more network interface components 128, such as a repeater, while wireless communication between the communication adapter 102 and the near-wing maintenance computer 126 may be direct wireless communication without any relay components.

The ground station 124 can enable communication with a variety of support systems, such as an access portal 130 that enables authorized users to access data, initiate tests, configure software, and perform other actions with respect to the engine control 122, where the communication adapter 102 acts as a secure gateway to limit access and interactions with the engine control 122. As another example, the ground station 124 can communicate with a notification system 132, which may trigger alerts, text messages, e-mails, and the like to authorized recipients regarding operational status of the gas turbine engine 104. The near-wing maintenance computer 126 may provide an authorized user with limited authority a capability to query the communication adapter 102 for fault data, test parameters, and other such information. In some embodiments, the near-wing maintenance computer 126 can be authorized with limited authority to make updates to select configuration parameters or data collection parameters of the communication adapter 102.

Figure 2:
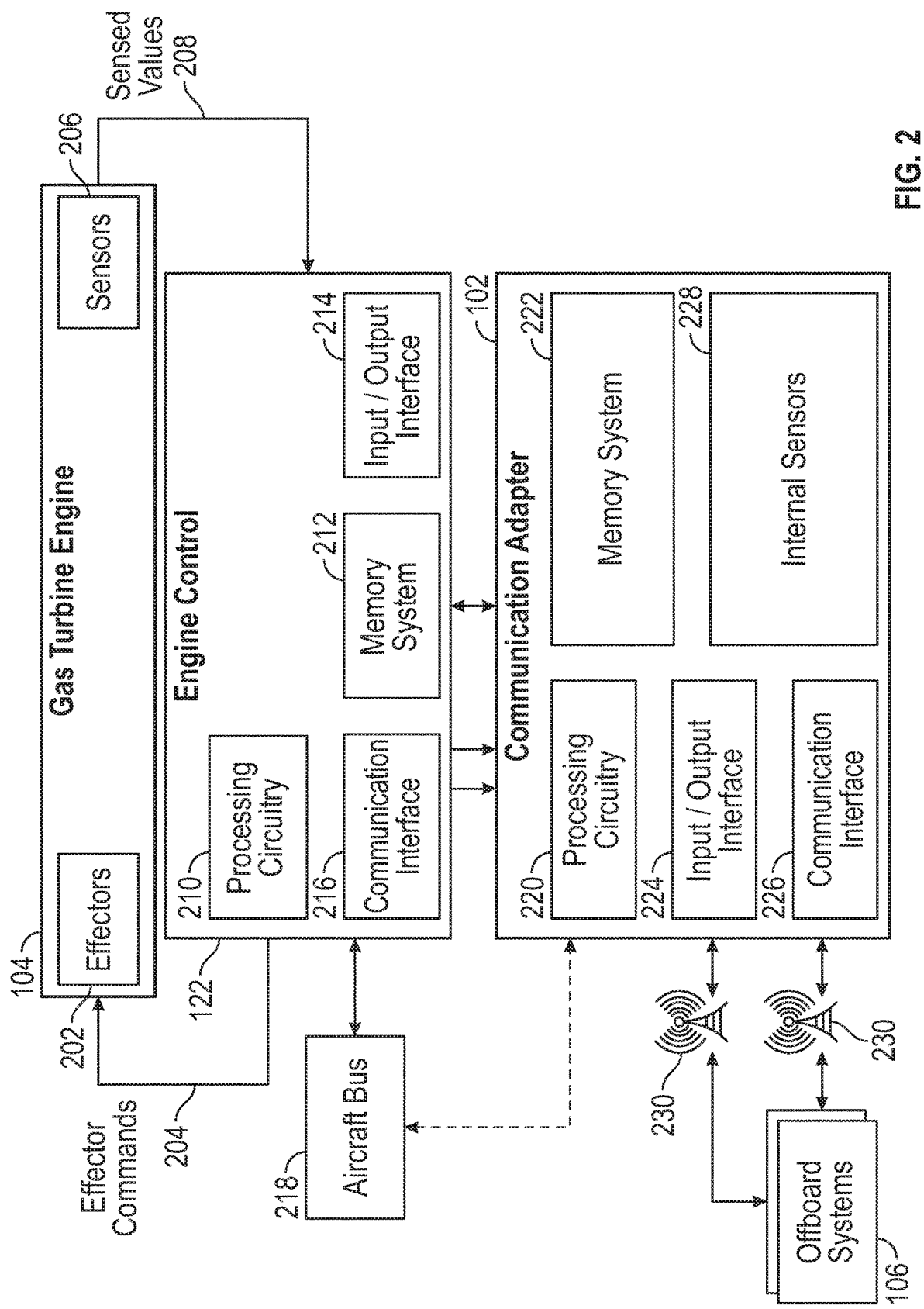
FIG. 2 is a block diagram illustrating further details of the system of FIG. 1, in accordance with an embodiment of the disclosure.

FIG. 2 is a block diagram illustrating further details of the system 100 of FIG. 1, in accordance with an embodiment of the disclosure. The engine control 122 can control effectors 202 of the gas turbine engine 104 by generating one or more effector commands 204. Examples of effectors 202 can include one or more motors, solenoids, valves, relays, pumps, heaters, and/or other such actuation control components. A plurality of sensors 206 can capture state data associated with the gas turbine engine 104 and provide sensed values 208 as feedback to the engine control 122 to enable closed-loop control of the gas turbine engine 104 according to one or more control laws. Examples of the sensors 206 can include one or more temperature sensors, pressure sensors, strain gauges, speed sensors, accelerometers, lube sensors, and the like.

The engine control 122 can be a full authority digital engine control that includes processing circuitry 210 and a memory system 212 configured to store a plurality of configuration items, where at least one of the configuration items includes a sequence of the computer executable instructions for execution by the processing circuitry 210.

Other types of configuration items can include data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 104. The processing circuitry 210 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 212 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The engine control 122 can also include one or more of an input/output interface 214, a communication interface 216, and/or other elements (not depicted). The input/output interface 214 can include support circuitry for interfacing with the effectors 202 and sensors 206, such as filters, amplifiers, digital-to-analog converters, analog-to-digital converters, and other such circuits to support digital and/or analog interfaces. Further, the input/output interface 214 can receive or output signals to/from other sources. The communication interface 216 can be communicatively coupled to the communication adapter 102. The communication interface 216 may also communicate with an aircraft bus 218 of the aircraft 108 of FIG. 1. The aircraft bus 218 may provide aircraft-level parameters and commands that are used by the engine control 122 to control the gas turbine engine 104 in real-time.

Similar to the engine control 122, the communication adapter 102 can include processing circuitry 220, a memory system 222, an input/output interface 224, and a communication interface 226. The processing circuitry 220 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 222 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form. The communication adapter 102 can also include a plurality of internal sensors 228. The internal sensors 228 can be, for example, one or more accelerometers, gyroscopes, barometers, a compass, a GPS, and other such sensors. The input/output interface 224 can process data collected from the internal sensors 228 and condition the data in a format usable by the processing circuitry 220. The communication interface 226 can interface with one or more antennas 230, which may be integrated with the communication adapter 102 or located remotely from the communication adapter 102, e.g., a shark-fin antenna mounted under or on the cowling 120 of FIG. 1.

The communication adapter 102 can act as a secure communication gateway with respect to the offboard systems 106. For example, the offboard systems 106 can request to load new/updated configuration items to the memory system 212 of the engine control 122 through the communication adapter 102. The communication interface 216 of the engine control 122 can interface to the communication interface 226 of the communication adapter 102 through a wired, optical, or magnetic coupling. The communication interface 226 can communicate wirelessly through antennas 230 to the offboard systems 106. The communication interface 226 may also have access to receive data directly from the aircraft bus 218 in some embodiments. In alternate embodiments, the communication adapter 102 can send a request to the engine control 122 to provide aircraft parameters received via the aircraft bus 218 and/or engine parameters computed by the engine control 122.

The communication adapter 102 can manage credentials and user authentication to limit access of the memory system 212 of the engine control 122. User authentication can be defined for particular users or classes of users, such as equipment-owner users, maintenance technicians, engineering users, and the like. For example, a maintenance technician may have authority to adjust trimmable constants or reprogram certain regions of the memory system 212. An engineering user may have authority to reprogram an operating system, boot program code, or application software in the memory system 212, in addition to having permissions of the maintenance technician and the equipment-owner user. If user authentication fails, for instance, by user credentials not being recognized with respect to user authentication data, then the communication adapter 102 can block access of the offboard systems 106 from reading from or writing to the memory system 212.

Configuration items received for the engine control 122 and/or the communication adapter 102 may be encrypted using various cryptographic methods to further enhance security. For example, the communication adapter 102 can apply a cryptographic algorithm using one or more parameters received and cryptographic information to decrypt an encrypted configuration item. A combination of transmitted and stored cryptographic information can be used together for decryption based on 'shared secrets' such that not all of the information is sent from the offboard systems 106 nor stored completely within the communication adapter 102. After decryption, authenticity of the configuration item can be verified using, for example, a digital signature of the configuration item. The resulting file can be a decrypted and authenticated configuration item, which may be temporarily stored in memory system 222 or otherwise buffered during authentication and passed to the engine control 122 upon authentication.

Separating the communication adapter 102 from the engine control 122 can enable the communication adapter 102 and the engine control 122 to have different expected service life durations. For example, to stay compatible with changes in wireless communication technologies used by the offboard systems 106, the communication adapter 102 may be upgraded at a faster interval than the engine control 122. The communication adapter 102 can have a lower processing and storage capacity than the engine control 122 to reduce power requirements, weight, and other costs associated with the communication adapter 102. Since the communication adapter 102 does not actively control the gas turbine engine 104, development cycles may be reduced as compared to implementing flight critical control algorithms and hardware of the engine control 122.

Figure 3:
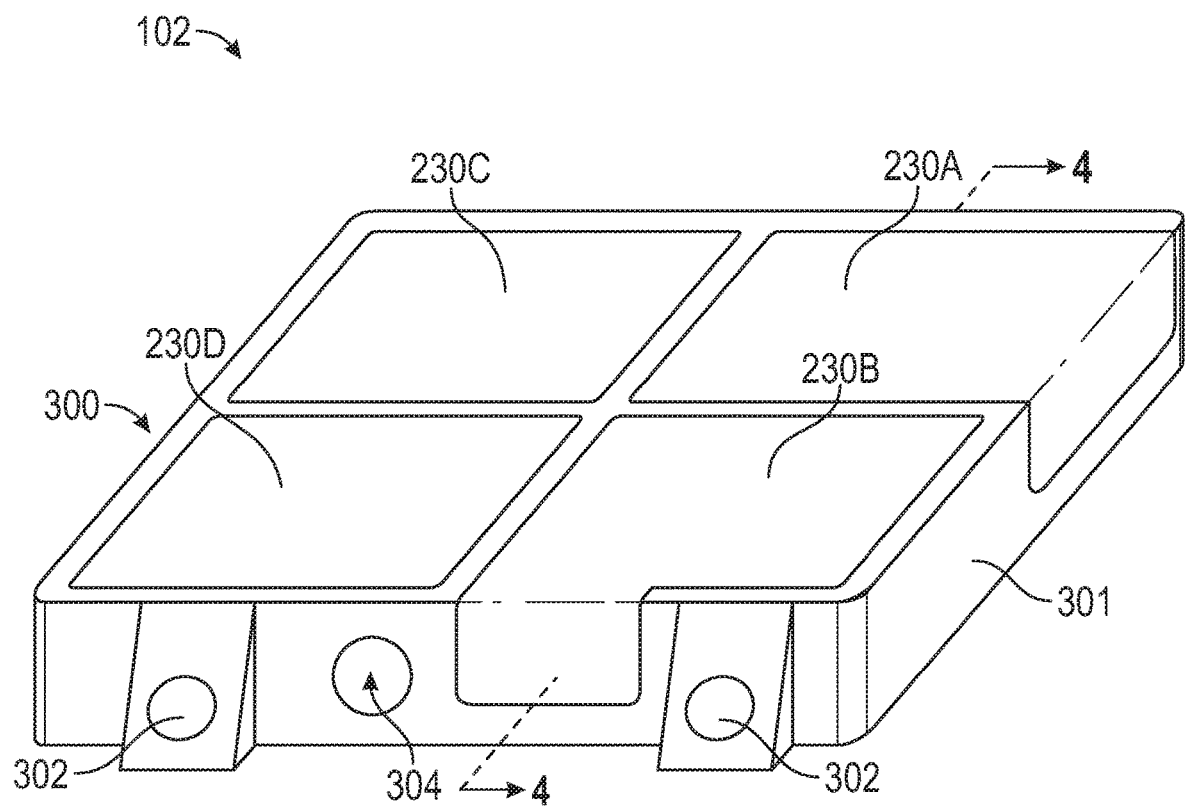
FIG. 3 is a perspective view of a housing of a communication adapter with multiple antennas, in accordance with an embodiment of the disclosure.
Figure 4:
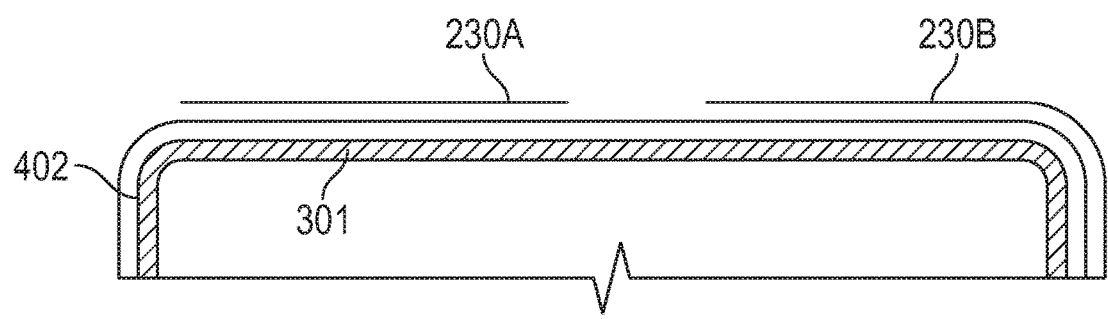
FIG. 4 is a sectional view of the housing of the communication adapter of FIG. 3, in accordance with an embodiment of the disclosure.

FIG. 3 is a perspective view of a housing 300 of the communication adapter 102 with multiple antennas 230 (e.g., 230A, 230B, 230C, 230D), in accordance with an embodiment of the disclosure. FIG. 4 is a sectional view of the housing 300 of the communication adapter 102 of FIG. 3, in accordance with an embodiment of the disclosure. As can be seen in the example of FIG. 3, the housing 300 includes a metal chassis 301 and a plurality of antennas 230 integrated therewith, which can be partitioned into four quadrants of the housing 300. The antennas 230 may include a Wi-Fi antenna, a global positioning system antenna, a cellular network antenna, and a satellite communication antenna. The housing 300 also includes a plurality of mounts 302 configured to couple the communication adapter 102 to the fan case 118 of the gas turbine engine 104. The antennas 230 can be isolated from the metal chassis 301 with a non-conductive substrate 402 between the metal chassis 301 and the antennas 230, as best seen in FIG. 4. Integrating the antennas 230 into mechanical packaging of the housing 300 can reduce weight and improve system reliability.

Further, the housing 300 can include one or more connector ports 304 to support wire-based communication and power supply connections with the engine control 122 of FIG. 1. Power supply connections between the engine control 122 and the communication adapter 102 can enable the engine control 122 to power/depower specific circuitry within the communication adapter 102. For example, power supply connections can be separately controlled by the engine control 122 to enable/disable the processing circuitry 220 of FIG. 2 independently from radio circuitry of the communication interface 226 of FIG. 2. Thus, the engine control 122 can control when the communication adapter 102 is able to use the antennas 230 for wireless communication functions, such as enabling radios for ground-only operation, disabling radios during takeoff and landing, or other such constraints. Keeping enablement/disablement logic for specific circuitry of the communication adapter 102 under the control of the engine control 122 can allow for software within the communication adapter 102 to be certified at a lower-level of safety criticality than the engine control 122 and may reduce logic complexity within the communication adapter 102.

Figure 5:
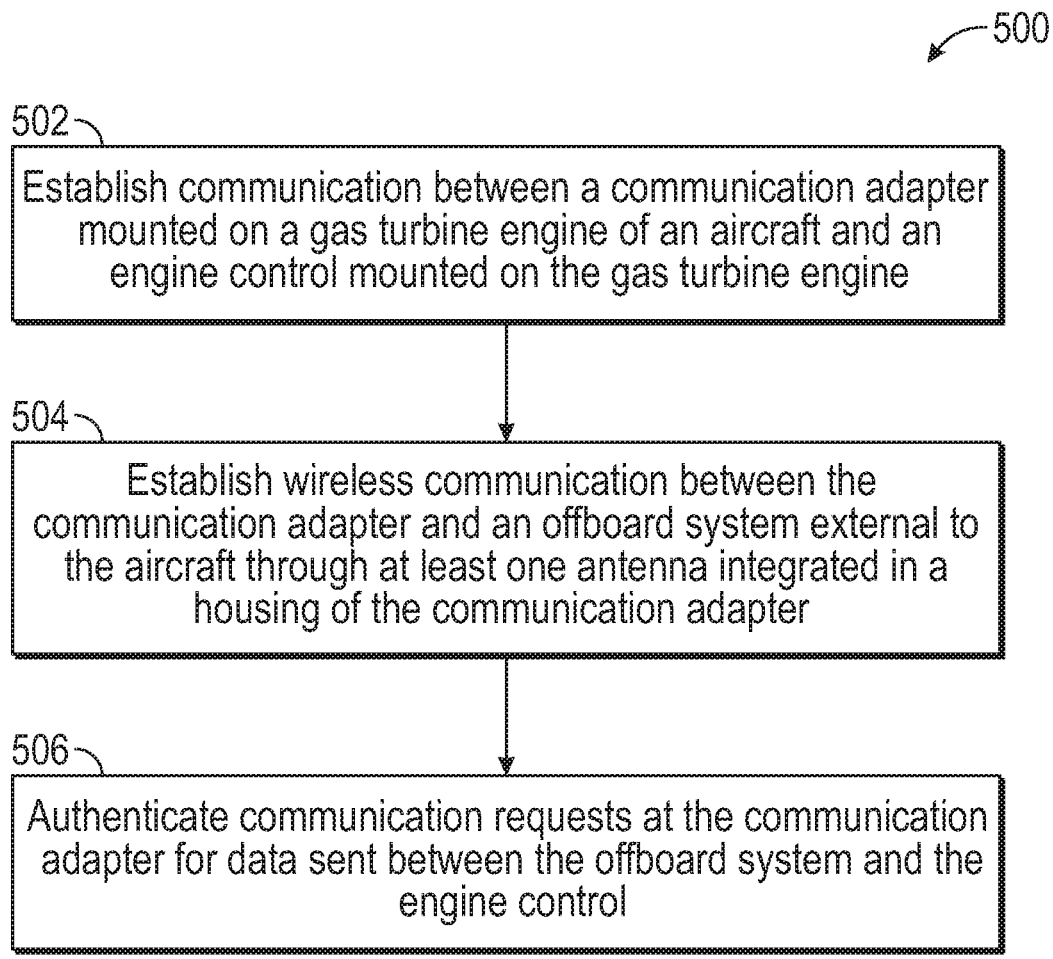
FIG. 5 is a flow chart illustrating a method, in accordance with an embodiment of the disclosure.

Referring now to FIG. 5 with continued reference to FIGS. 1-4, FIG. 5 is a flow chart illustrating a method 500 for using the communication adapter 102 of FIG. 1, in accordance with an embodiment. The method 500 may be performed, for example, by the communication adapter 102 in conjunction with the engine control 122 of FIG. 1 and at least one of the offboard systems 106 of FIG. 1.

At block 502, the communication adapter 102 can establish communication with an engine control 122 mounted on a gas turbine engine 104 of an aircraft 108, where the communication adapter 102 includes a housing 300 configured to be coupled to the gas turbine engine 104 and a plurality of antennas 230 integrated in the housing 300. The housing 300 can include a plurality of mounts 302 configured to couple the communication adapter 102 to a fan case 118 of the gas turbine engine 104. The housing 300 can also include a metal chassis 301 with a non-conductive substrate 402 between the metal chassis 301 and the antennas 230. The antennas 230 can be partitioned into four quadrants (e.g., 230A, 230B, 230C, 230D) of the housing 300, where the antennas 230 may include a Wi-Fi antenna, a global positioning system antenna, a cellular network antenna, and/or a satellite communication antenna. Other partitions are contemplated. For example, there may be one or more antennas 230 integrated in the housing 300 and one or more antennas 230 remotely located from the communication adapter 102, where the antennas 230 are communicatively coupled to the communication interface 226. Further, there can be any number of antennas 230 mounted to or otherwise integrated with the housing 300.

At block 504, the communication adapter 102 can establish wireless communication with an offboard system 106 external to the aircraft 108 through at least one of the antennas 230 integrated in the housing 300 of the communication adapter 102. At block 506, the communication adapter 102 can authenticate communication requests at the communication adapter 102 for data sent between the offboard system 106 and the engine control 122. The data can include, for example, one or more of: flight data, engine data, and sensor data.

In embodiments, the processing circuitry 220 of the communication adapter 102 can be further configured to support data uploads, downloads, software updates, test functions, and remote trouble-shooting. The processing circuitry 220 of the communication adapter 102 can also be configured to interface with an aircraft bus 218 of the aircraft 108. The engine control 122 can selectively enable and disable operation of targeted circuitry within the communication adapter 102. One or more connector ports 304 of housing 300 can provide at least two independent power supply connections to externally control power supplied to the processing circuitry 220 and the communication interface 226 of the communication adapter 102, which can be driven by logic of the engine control 122, for instance, through input/output interface 214 or another interface.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A communication adapter of a gas turbine engine of an aircraft, the communication adapter comprising:
   a housing configured to be coupled to the gas turbine engine;
   a plurality of antennas integrated in the housing;

a communication interface configured to communicate wirelessly through the antennas to an offboard system external to the aircraft;
one or more connector ports configured to provide at least two independent power supply connections to externally and separately control power supplied to processing circuitry and the communication interface;
a memory system; and
the processing circuitry configured to:
establish communication with an engine control mounted on the gas turbine engine;
establish wireless communication between the communication adapter and the offboard system external to the aircraft through at least one of the antennas integrated in the housing of the communication adapter; and
authenticate communication requests at the communication adapter for data sent between the offboard system and the engine control.

2. The communication adapter of claim 1, wherein the housing comprises a plurality of mounts configured to couple the communication adapter to a fan case of the gas turbine engine.

3. The communication adapter of claim 2, wherein the housing comprises a metal chassis with a non-conductive substrate between the metal chassis and the antennas.

4. The communication adapter of claim 3, wherein the antennas are partitioned into four quadrants of the housing, the antennas comprising a Wi-Fi antenna, a global positioning system antenna, a cellular network antenna, and a satellite communication antenna.

5. The communication adapter of claim 1, wherein the processing circuitry is further configured to support data uploads, downloads, software updates, test functions, and remote trouble-shooting, and wherein the data comprises one or more of: flight data, engine data, and sensor data.

6. The communication adapter of claim 1, wherein the processing circuitry is further configured to interface with an aircraft bus of the aircraft.

7. A method comprising:
establishing, by a communication adapter, communication with an engine control mounted on a gas turbine engine of an aircraft, wherein the communication adapter comprises a housing coupled to the gas turbine engine and a plurality of antennas integrated in the housing;
establishing wireless communication between the communication adapter and an offboard system external to the aircraft through at least one of the antennas integrated in the housing of the communication adapter;
authenticating communication requests at the communication adapter for data sent between the offboard system and the engine control; and
separately controlling power to processing circuitry and a communication interface of the communication adapter responsive to at least two independent power supply connections externally controlled through one or more connector ports of the communication adapter.

8. The method of claim 7, wherein the housing comprises a plurality of mounts that couple the communication adapter to a fan case of the gas turbine engine.

9. The method of claim 8, wherein the housing comprises a metal chassis with a non-conductive substrate between the metal chassis and the antennas.

10. The method of claim 9, wherein the antennas are partitioned into four quadrants of the housing, the antennas comprising a Wi-Fi antenna, a global positioning system antenna, a cellular network antenna, and a satellite communication antenna.

11. The method of claim 7, further comprising:
supporting, by the communication adapter, data uploads, downloads, software updates, test functions, and remote trouble-shooting initiated through the offboard system, wherein the data comprises one or more of: flight data, engine data, and sensor data.

12. The method of claim 7, further comprising:
interfacing the communication adapter with an aircraft bus of the aircraft.

13. A gas turbine engine of an aircraft, the gas turbine engine comprising:
a compressor section;
a combustor section;
a turbine section;
an engine control configured to monitor and control operation of the gas turbine engine in real-time; and
a communication adapter comprising a housing and a plurality of antennas integrated in the housing, wherein the communication adapter is configured to establish communication with the engine control and wireless communication with an offboard system external to the aircraft through at least one of the antennas integrated in the housing of the communication adapter, wherein the housing comprises a metal chassis with a non-conductive substrate between the metal chassis and the antennas, and the antennas are partitioned into four quadrants of the housing, the antennas comprising a Wi-Fi antenna, a global positioning system antenna, a cellular network antenna, and a satellite communication antenna.

14. The gas turbine engine of claim 13, wherein the communication adapter is further configured to support data uploads, downloads, software updates, test functions, and remote trouble-shooting, and wherein the data comprises one or more of: flight data, engine data, and sensor data.

15. The gas turbine engine of claim 13, wherein the communication adapter is further configured to interface with an aircraft bus of the aircraft.

16. The gas turbine engine of claim 13, wherein the engine control is coupled to one or more connector ports of the communication adapter, and the engine control is configured to control at least two independent power supply connections through the one or more connector ports to separately control power supplied to processing circuitry and a communication interface of the communication adapter.

* * * * *